United States Patent
Kirkpatrick et al.

(10) Patent No.: US 8,510,947 B2
(45) Date of Patent: Aug. 20, 2013

(54) TURBINE BLADE FABRICATION

(75) Inventors: Bowden Kirkpatrick, Bennington, VT (US); Peggy Lynn Baehmann, Glenville, NY (US); Shu Ching Quek, Clifton Park, NY (US); Grama Narasimhaprasad Praveen, Clifton Park, NY (US); Youdong Zhou, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1166 days.

(21) Appl. No.: 12/271,420

(22) Filed: Nov. 14, 2008

(65) Prior Publication Data

US 2010/0122442 A1     May 20, 2010

(51) Int. Cl.
*B23P 15/04*     (2006.01)
*B23P 11/00*     (2006.01)
*B21K 3/04*      (2006.01)
*B21D 53/78*     (2006.01)
*B64C 11/20*     (2006.01)
*F03D 11/02*     (2006.01)

(52) U.S. Cl.
USPC ........ 29/889.71; 29/889.6; 29/889.7; 29/411; 29/415; 29/416; 29/525.01; 29/525.02; 29/525.11; 416/123 B; 416/132 R; 416/223 R; 416/226; 416/229 R

(58) Field of Classification Search
USPC ........... 29/889, 889.2, 889.21, 889.6, 889.61, 29/889.7, 889.71, 889.72, 889.721, 889.722, 29/411–416, 426.1, 426.3, 428, 455.1, 463, 29/525.01, 525.08, 525.02, 525.11; 416/223 R, 416/132 R, 132 B, 226, 229, 229 R
See application file for complete search history.

(56) References Cited

U.S. PATENT DOCUMENTS

| | | | |
|---|---|---|---|
| 4,389,162 A   |        | 6/1983  | Doellinger et al. |
| 4,452,658 A   | *      | 6/1984  | Schramm ..................... 156/245 |
| 4,474,536 A   |        | 10/1984 | Gougeon et al. |
| 4,643,646 A   |        | 2/1987  | Hahn et al. |
| 4,976,587 A   |        | 12/1990 | Johnston et al. |
| 5,129,787 A   | *      | 7/1992  | Violette et al. ................ 416/226 |
| 6,234,423 B1  | *      | 5/2001  | Hirahara et al. ........... 244/123.7 |
| 7,179,059 B2  |        | 2/2007  | Sorensen et al. |
| 7,186,086 B2  |        | 3/2007  | Yoshida |
| 7,481,624 B2  |        | 1/2009  | Wobben |
| 7,665,273 B2  |        | 2/2010  | Fuellhaas et al. |
| 7,901,188 B2  | *      | 3/2011  | Llorente Gonzalez et al. .............................. 416/228 |
| 2003/0138290 A1 | *    | 7/2003  | Wobben ........................ 403/293 |
| 2006/0127222 A1 | *    | 6/2006  | Arelt ............................ 416/224 |
| 2007/0025856 A1 |      | 2/2007  | Moroz |
| 2007/0217918 A1 | *    | 9/2007  | Baker et al. ............... 416/227 R |
| 2007/0253824 A1 |      | 11/2007 | Eyb |
| 2007/0258823 A1 |      | 11/2007 | Haarh et al. |
| 2008/0069699 A1 |      | 3/2008  | Bech |
| 2009/0208341 A1 |      | 8/2009  | Llorente Gonzalez et al. |
| 2011/0091326 A1 | *    | 4/2011  | Hancock ...................... 416/225 |

FOREIGN PATENT DOCUMENTS

| | | |
|---|---|---|
| CN | 1659348 A   | 8/2005 |
| CN | 1957178 A   | 5/2007 |
| CN | 101151458 A | 3/2008 |
| EP | 1184566 A1 * | 3/2002 |

(Continued)

*Primary Examiner* — Sarang Afzali
(74) *Attorney, Agent, or Firm* — Ann M. Agosti

(57) ABSTRACT

A method includes joining an integral bulkhead and a blade shell to form a blade and separating the blade into two blade segments at a location including the integral bulkhead such that each blade segment comprises a portion of the integral bulkhead and a portion of the blade shell.

13 Claims, 5 Drawing Sheets

(56) References Cited

FOREIGN PATENT DOCUMENTS

| | | |
|---|---|---|
| EP | 1244873 B1 | 4/2004 |
| EP | 1561947 A2 | 8/2005 |
| EP | 1584817 A1 | 10/2005 |
| GB | 924859 A | 5/1963 |
| GB | 2416195 A | 1/2006 |
| JP | 55156797 A | 12/1980 |
| WO | 2006002621 A1 | 1/2006 |

* cited by examiner

TURBINE BLADE FABRICATION

BACKGROUND

Embodiments disclosed herein relate generally to turbine blades and methods of manufacturing the turbine blades, and, more particularly, to multiple-piece composite turbine blades and methods of manufacturing the same.

Turbine blades used for applications such as wind turbines often have large sizes. Shipment of large blades from where the blades are made to where the blades will be used can be inconvenient and expensive.

There is a need in the art to ship the turbine blades in sections and then join the sections together at a remote assembly location without undesirable levels of complexity and expense. Accordingly, an improved joint system would be useful.

BRIEF DESCRIPTION

In accordance with one embodiment disclosed herein, a method includes joining an integral bulkhead and a blade shell to form a blade; and separating the blade into two blade segments at a location including the integral bulkhead such that each blade segment comprises a portion of the integral bulkhead and a portion of the blade shell.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
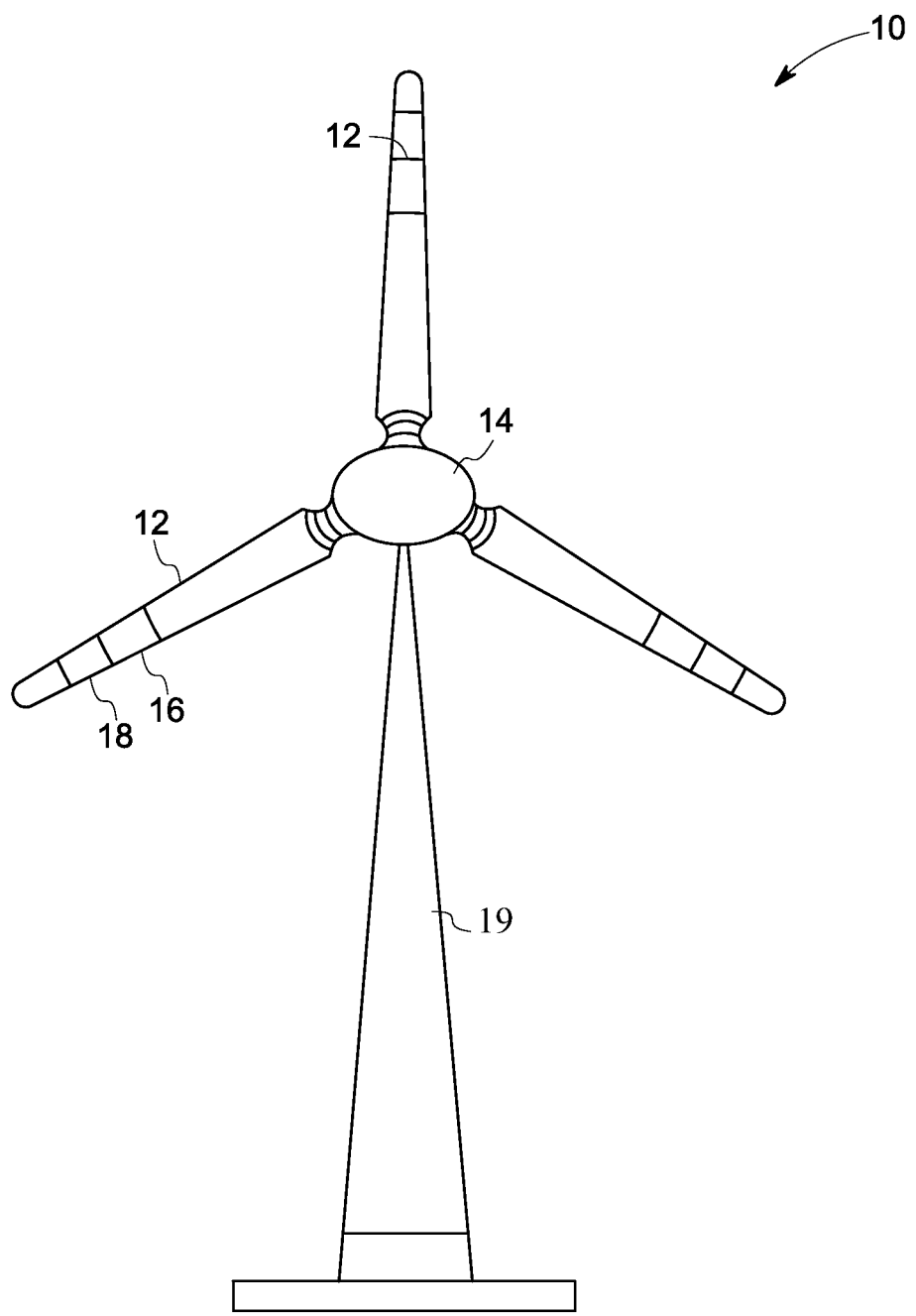
FIG. 1 is a schematic illustration of a wind turbine including several blades.

As discussed in detail below, embodiments of the present invention include methods for joining turbine blades. As used herein, the term "turbine blades" refers to blades used in various applications such as, but not limited to, wind turbines and aircraft systems. As used herein, singular forms such as "a," "an," and "the" include plural referents unless the context clearly dictates otherwise. For example, although a one bulkhead, two-segment blade is shown in the drawings for purposes of illustration, more bulkheads and segments may be included if desired.

In one embodiment, a method includes joining an integral bulkhead and a blade shell to form a blade and separating the blade into two blade segments at a location including the integral bulkhead such that each blade segment comprises a portion of the integral bulkhead and a portion of the blade shell. In certain embodiments, the bulkhead is fabricated as a one-piece component before it is formed into the blade. In other embodiments, the bulkhead is a composite component with first and second bulkhead parts associated with each other and integrated as the bulkhead by a locking element.

FIGS. 1-7 show embodiments of the invention used in a wind turbine system 10. Referring to FIG. 1, wind turbine system 10 includes a rotor 14 and several blades 12. Each blade 12 includes multiple blade segments 16 and 18. As used herein after, the term "outboard" means farther from rotor 14, and "inboard" means closer to rotor 14. Thus, blade segment 16 is an inboard blade segment, and blade segment 18 is an outboard blade segment. The blades 12 are mounted atop a tower 19. In certain embodiments, blade 12 is made of high strength composite materials that are tolerant to harsh environmental conditions such as, but not limited to, inclement weather in the field during assembly.

Figure 2:
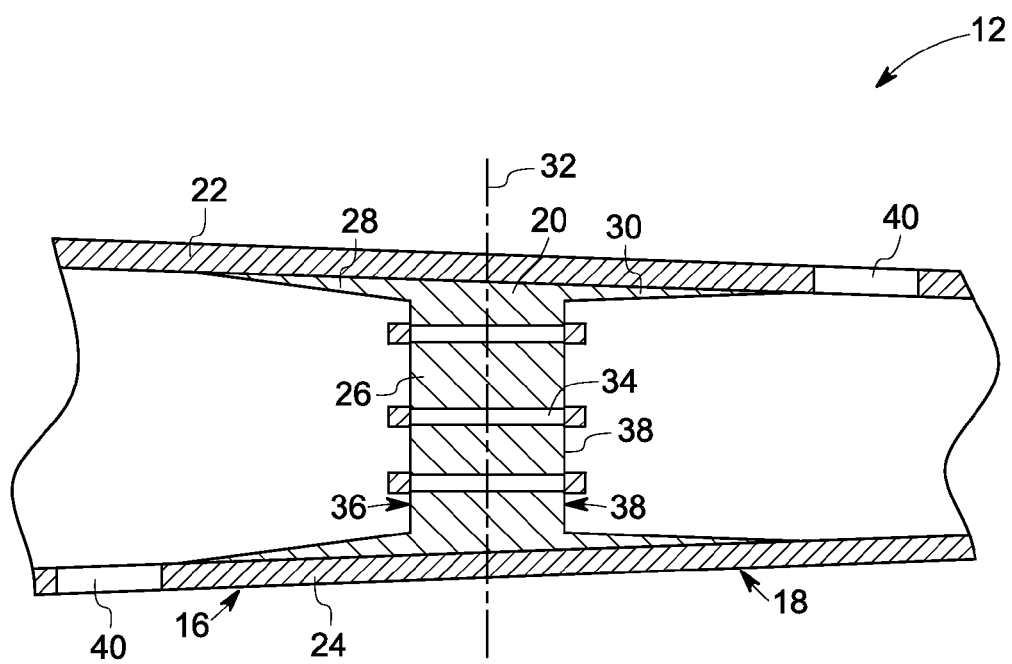
FIG. 2 is a partial cross-sectional view of a blade according to an embodiment of the invention.

FIG. 2 is a partial cross-sectional view of blade 12 along a longitudinal direction. Blade 12 includes an integral bulkhead 20 enclosed in upper and lower blade shells 22 and 24. In certain embodiments, upper and lower blade shells 22 and 24 comprise a one-piece shell. Bulkhead 20 includes a center flange 26 and an inboard and outboard periphery flanges 28 and 30 extending from center flange 26 toward the inboard and the outboard directions. Bulkhead 20 has an axis 32 which is, in one embodiment, a center line of center flange 26. In certain embodiments, center flange 26 defines a plurality of threaded holes 34 extending through an inboard and an outboard surface of center flange 26. In one embodiment, bulkhead 20 comprises a material such as glass composites, carbon composites, stainless steel, titanium, titanium alloys, aluminum and aluminum alloys or the like.

According to an exemplary embodiment of the invention, bulkhead 20 is pre-produced and is built in blade 12 during assembling of the blade 12 at a blade factory. In certain embodiments, a method of building bulkhead 20 into blade 12 may include use of molded blade shells 22 and 24. In one embodiment, shells 22 and 24 include fiberglass and a combination of wood and foam. The integral bulkhead 20 may then be integrated into the wind blade during the process of resin infusion of the upper and lower blade shells 22 and 24. In one embodiment, bulkhead 20 is pre-cured, and lower blade shell 24 is coated with an adhesive to hold bulkhead 20 in place. In a non-limiting example, the adhesive includes epoxy, an infusion resin, or combinations thereof. Adhesive may be applied to the upper blade shell 22, or to the lower blade shell 24, or to both. Outer surfaces of the inboard and outboard periphery flanges 28, 30 abut against an inner surface of blade shells 22 and 24.

In an alternative embodiment, the method of building bulkhead 20 into blade 12 may include inserting bulkhead 20 in a composite monocoque shell. In certain embodiments, bulkhead 20 is built in the composite monocoque shell during an insert molding manufacturing process of the composite monocoque shell.

After bulkhead 20 is integrated within blade 12, blade 12 is separated into the inboard and the outboard blade segments 16 and 18 along axis 32. In one embodiment, after the blade 12 is completed, blade 12 is cut into inboard and outboard segments 16 and 18 along axis 32, for example, by a tool such as a bandsaw or a circular saw. After a kerf of the tool passes through the axis 32, bulkhead 20 may be separated into inboard and outboard bulkhead parts 36 and 38.

In one embodiment, bulkhead 20 is originally fabricated as a one-piece element before being integrated into shell 22 and 24. For example, the integral bulkhead may be produced by molding the integral bulkhead as a one piece component. If desired, to enable easier separation, one-piece bulkhead 20 may be shimmed apart along the axis 32 before being integrated into shells 22 and 24, or during the process of being integrated into the shells. In another embodiment, bulkhead 20 comprises inboard and out board bulkhead parts 36 and 38 integrated together by an adhesive or a fastener, for example, before being assembled with shell 22 and 24. One such example is discussed below with respect to FIG. 6. If any hardware is used for fastening the bulkhead parts, such hardware will likely be severed during separation. After separation, the hardware may optionally be removed and the remaining surfaces may be smoothened.

Figure 7:
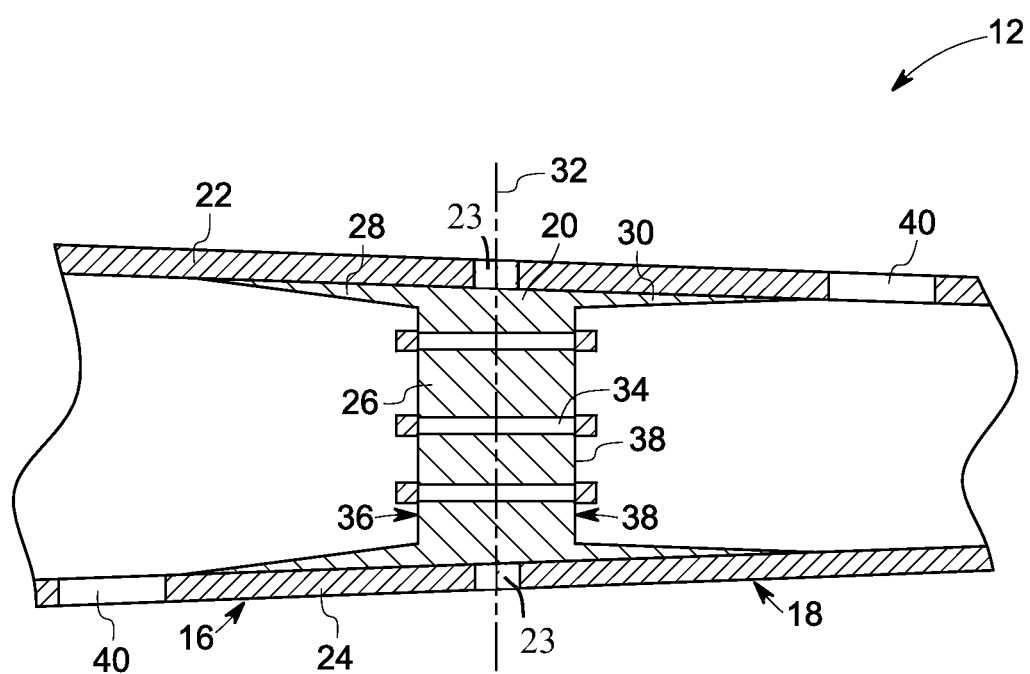
FIG. 7 is partial a cross-sectional view of a blade according to another embodiment of the invention.

In an alternate embodiment of the invention, as shown in FIG. 7, upper and lower blade shells 22 and 24 may comprise two upper blade shells and two lower blade shells with ends of the two top blade shells situated at a top portion of the separation location and ends of the two lower blade shells situated at a lower portion of the separation location such that the two upper and lower shells are segmented along axis 32 prior to fabrication. If desired, a gap 23 can be left in the area of axis 32 such that only bulkhead 20 need be divided into the outboard and the inboard bulkhead parts 36 and 38 along axis 32.

After separation, the inboard and the outboard blade segments 16 and 18 are shipped to the field to be assembled during final assembly of wind turbine assembly 10. In the field, the inboard and the outboard blade segments 16 and 18 are aligned and re-assembled as blade 12. The inboard and the outboard blade segments 16 and 18 are secured with each other by, for example, utilizing securing elements such as bolts or studs and nuts that are secured in threaded holes 34. In one embodiment, the upper and the lower blade shells 22, 24 respectively define an access hole 40 whereby, tools (not shown) can be used to secure the bolts in the threaded holes 34 through the access holes 40. In such an embodiment, caps (not shown) may be provided to cover the access holes 40 after the blade segments 16, 18 are bonded together. The caps can be secured to the shell by, for example, screwing additional bolts to the shell.

Figure 3:
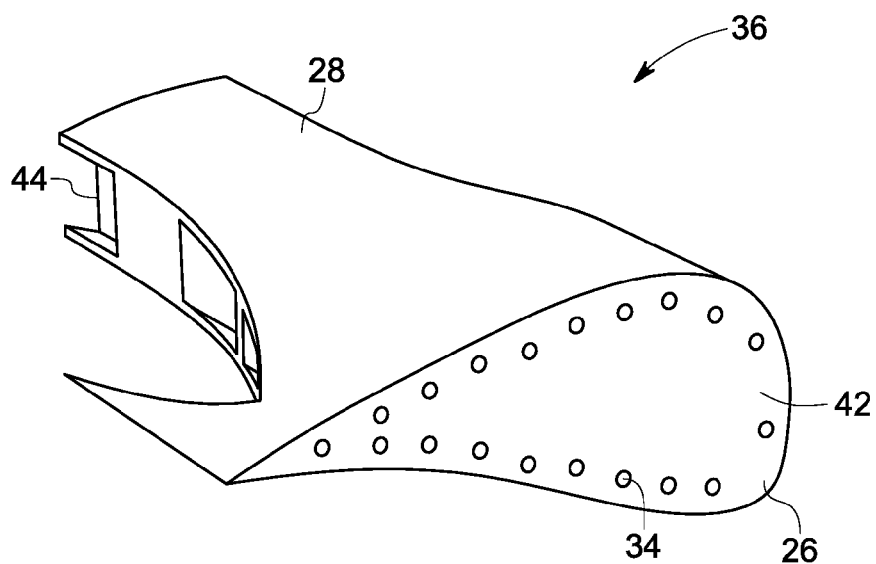
FIGS. 3-5 are perspective views of a bulkhead part according to an embodiment of the invention.
Figure 4:
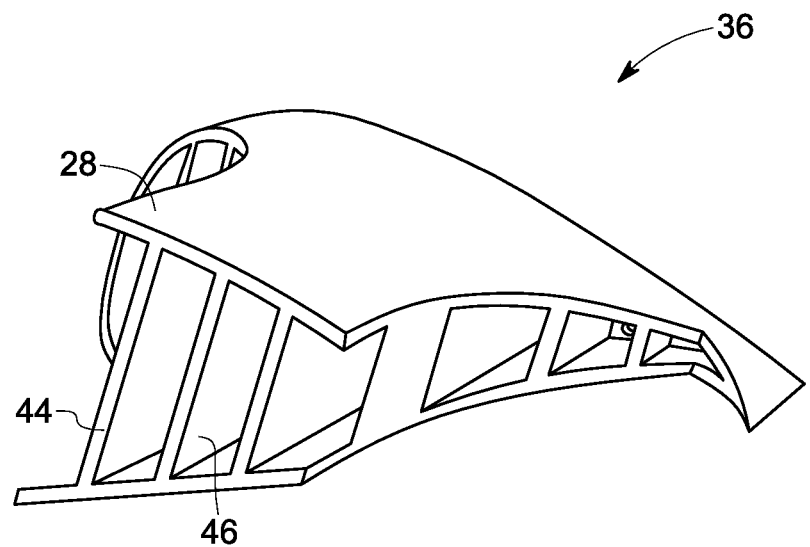
Figure 5:
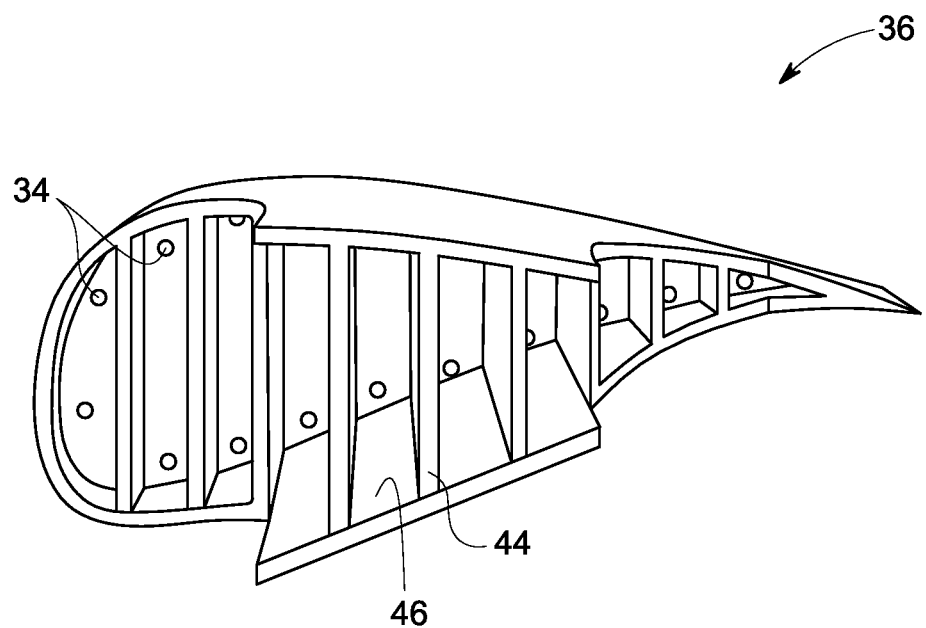

FIGS. 3-5 show perspective views of one bulkhead part, for example the inboard bulkhead part 36, from different points of view according to one embodiment. The bulkhead part 36 includes a mating surface 42 at where the center flange 26 is separated. The bulkhead part 36 further may include a plurality of longitudinal ribs 44 for stiffening with slots 46 (FIGS. 4 and 5) defined therebetween. Threaded holes 34 are distributed along a circumferential direction of the center flange 26 and communicate with corresponding slots 46.

Figure 6:
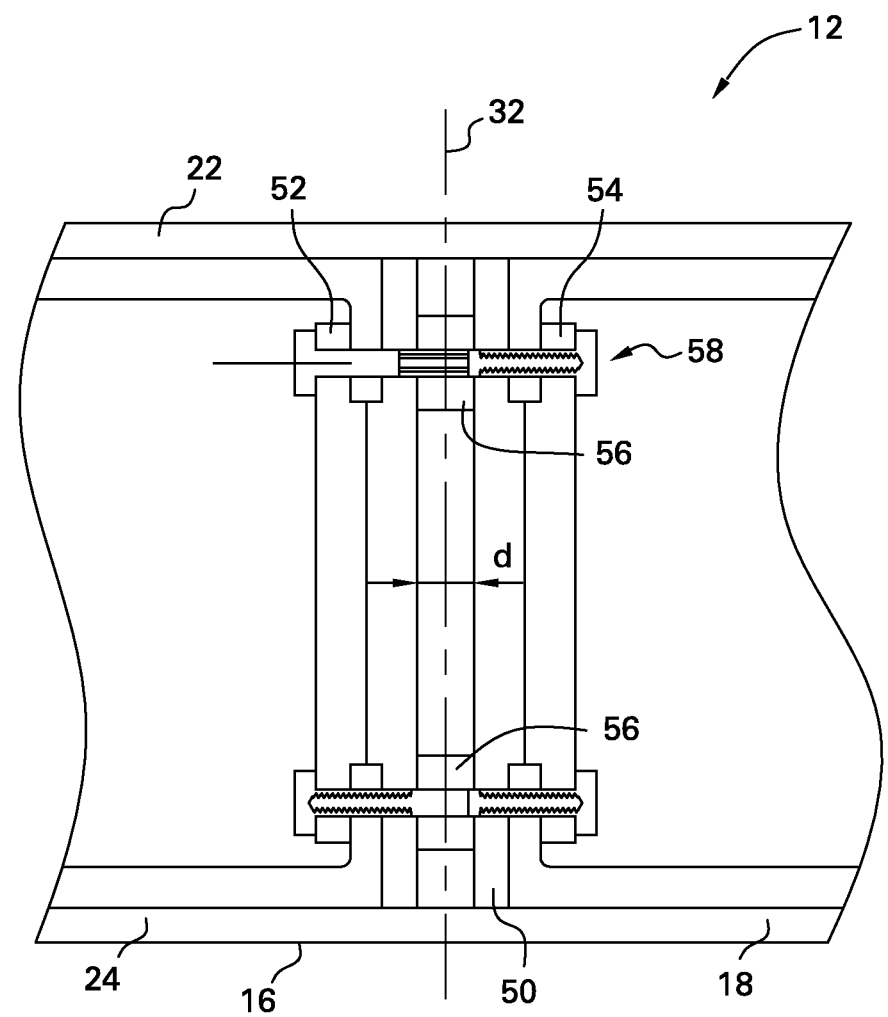
FIG. 6 is partial a cross-sectional view of a blade according to another embodiment of the invention.

FIG. 6 is a partial cross-sectional view of blade 12 according to an embodiment of the invention wherein a bulkhead includes an inboard and an outboard bulkhead part 52 and 54, and at least one spacer 56 between inboard and outboard bulkhead parts 52 and 54 for spacing inboard and outboard bulkhead parts 52 and 54 with a distance d. In one embodiment, inboard and outboard bulkhead parts 52 and 54 and spacer 56 define corresponding threaded holes for mating with securing elements 58 so as to form the integral bulkhead 50.

In certain embodiments, the securing elements 58 comprise bolts such as T-Bolts and are fabricated from high strength and fatigue resistant metals, such as titanium alloys including Ti-6Al-4V, Ti-6Al-6V-2Sn and variations of titanium alloys, or stainless steel including TS series, stainless 300, 416-HT, Aermet 100 and the like.

After bulkhead 50 is integrated, bulkhead 50 may be built into upper and lower blade shells 22 and 24 to form blade 12 in a similar manner as discussed above with respect to FIG. 2. Blade 12 is then separated into the inboard and the outboard blade segments 16 and 18 along the axis 32 for shipment. The spacer 56 is typically destroyed during the separation and removed from the blade 12. After the inboard and the outboard blade segments 16, 18 are shipped to the field and are re-assembled into a blade 12 by securing elements, the outboard and the inboard bulkhead parts 52, 54 may thus be aligned face to face without being separated by distance d.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
joining at least one integral bulkhead and a blade shell to form a blade; and then
separating the blade into multiple blade segments such that each blade segment comprises a portion of the at least one integral bulkhead and a portion of the blade shell, wherein the at least one integral bulkhead includes a center flange, an inboard periphery flange extending from the center flange towards an inboard direction, and an outboard periphery flange extending from the center flange towards an outboard direction, and wherein separating the blade comprises separating along an axis of the center flange.

2. The method of claim 1 further comprising transporting the blade segments.

3. The method of claim 2 further comprising, after transporting, using securing elements for re-assembling the blade.

4. The method of claim 3 wherein the at least one integral bulkhead comprises a plurality of ribs extending from the center flange and between the inboard and outboard periphery flanges along a longitudinal direction of the blade.

5. The method of claim 4 wherein the center flange comprises threaded holes between at least some of the ribs, and further comprising inserting the securing elements through the threaded holes.

6. The method of claim 1 further comprising producing the at least one integral bulkhead by integrating an inboard bulkhead part and an outboard bulkhead part together by a securing element.

7. The method of claim 6 wherein separating the blade comprises separating along an axis of the center flange including the securing element.

8. The method of claim 7 further comprising providing at least one spacer between the inboard and the outboard bulkhead parts of the at least one integral bulkhead before joining the integral bulkhead and the blade shell.

9. The method of claim 1 wherein joining comprises positioning the at least one integral bulkhead between a blade shell comprising upper and lower blade shells.

10. The method of claim 1 wherein joining comprises positioning the at least one integral bulkhead between a blade shell comprising two upper blade shells and two lower blade shells.

11. The method of claim 1, wherein joining comprises inserting the at least one integral bulkhead into a composite monocoque shell.

12. The method of claim 1 further comprising producing the at least one integral bulkhead by molding the integral bulkhead as a one piece component.

13. A method comprising:
joining at least one bulkhead and a blade shell to form a blade, wherein the at least one bulkhead comprises at least one center flange;
then separating the formed blade into multiple blade segments such that each blade segment comprises a portion of the at least one bulkhead and a portion of the blade shell, wherein separating the formed blade comprises separating the formed blade through an axis of at least one of the center flanges;
then transporting the blade segments; and
then re-assembling the blade,
wherein the at least one bulkhead includes a center flange, an inboard periphery flange extending from the center flange towards an inboard direction, and an outboard periphery flange extending from the center flange towards an outboard direction, and wherein separating the blade comprises separating along an axis of the center flange.

\* \* \* \* \*